A. H. GIBSON.
CHANNELING MACHINE.
APPLICATION FILED FEB. 11, 1908.
944,672.
Patented Dec. 28, 1909.
4 SHEETS—SHEET 1.
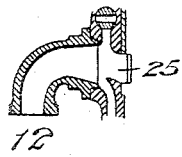
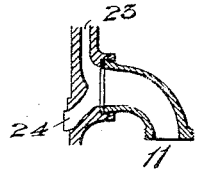
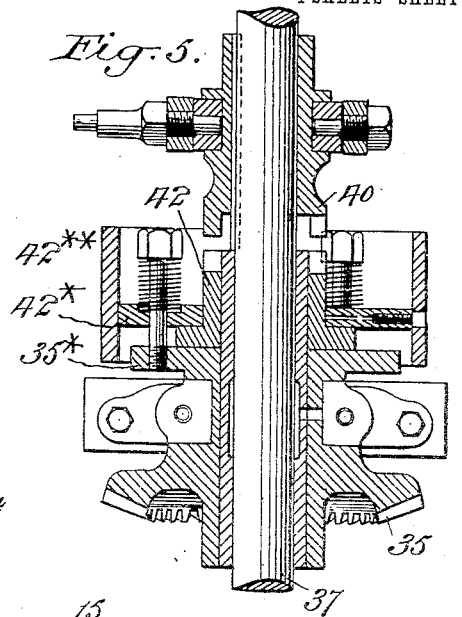
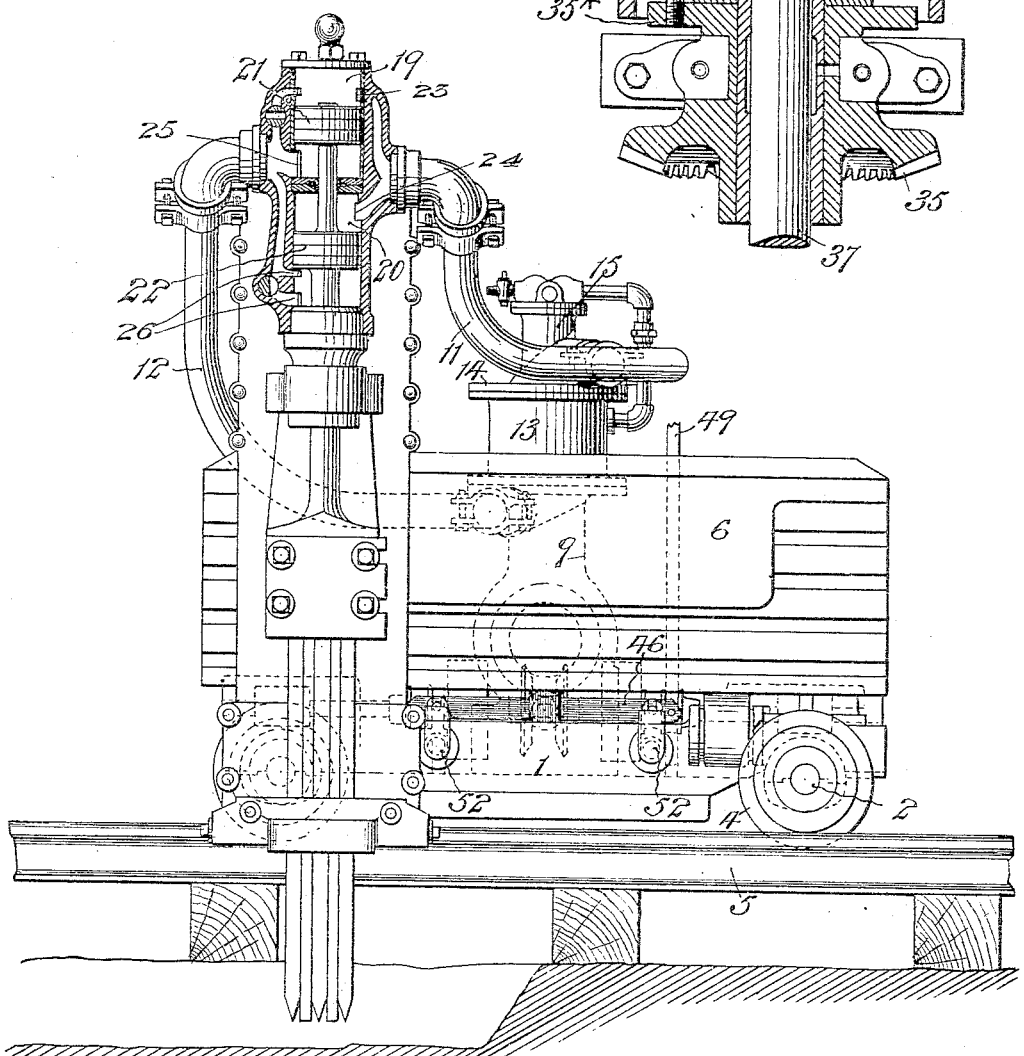
Witnesses:
F. George Barry,
Henry Thieme.
Inventor:
Arthur H. Gibson
by attorneys

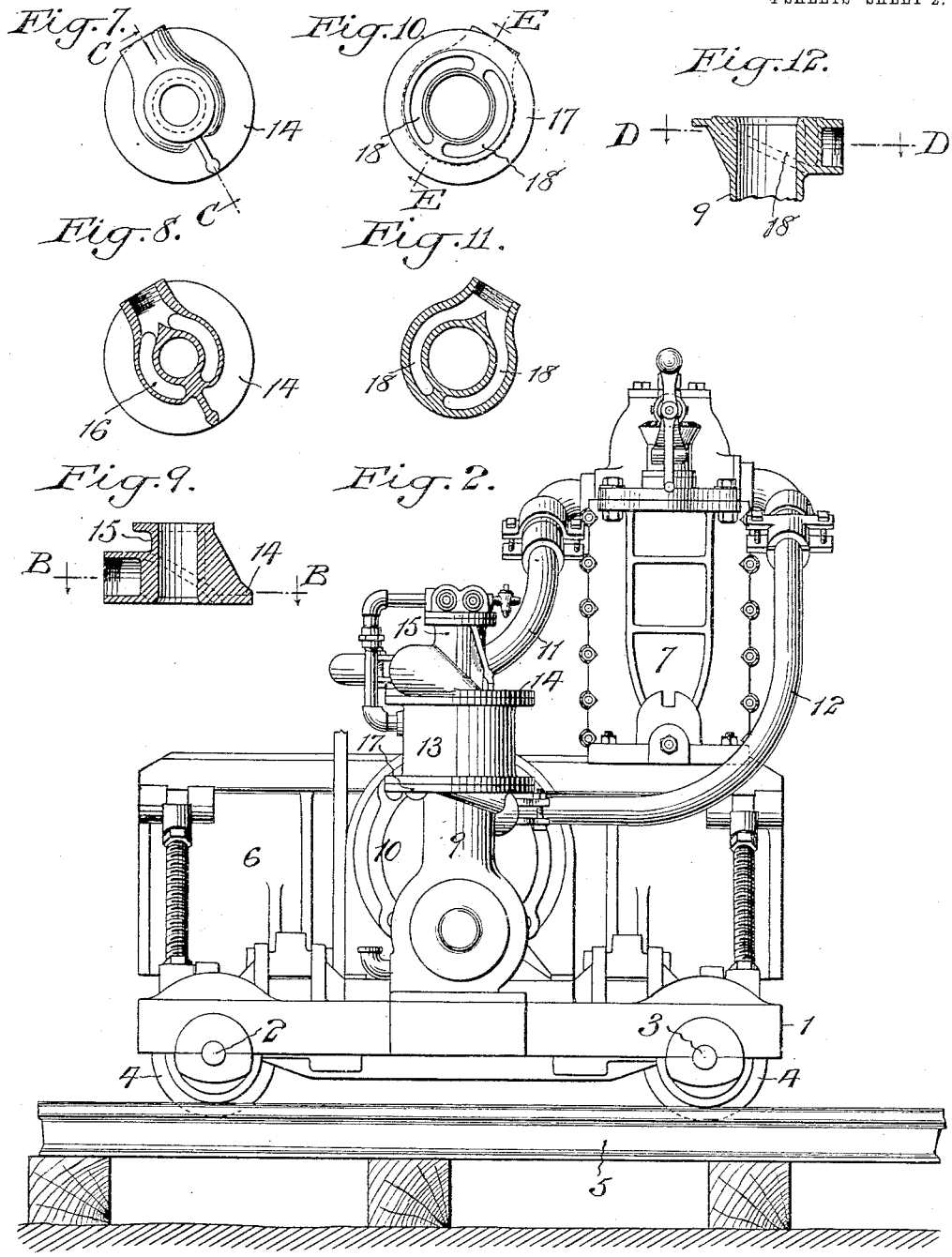

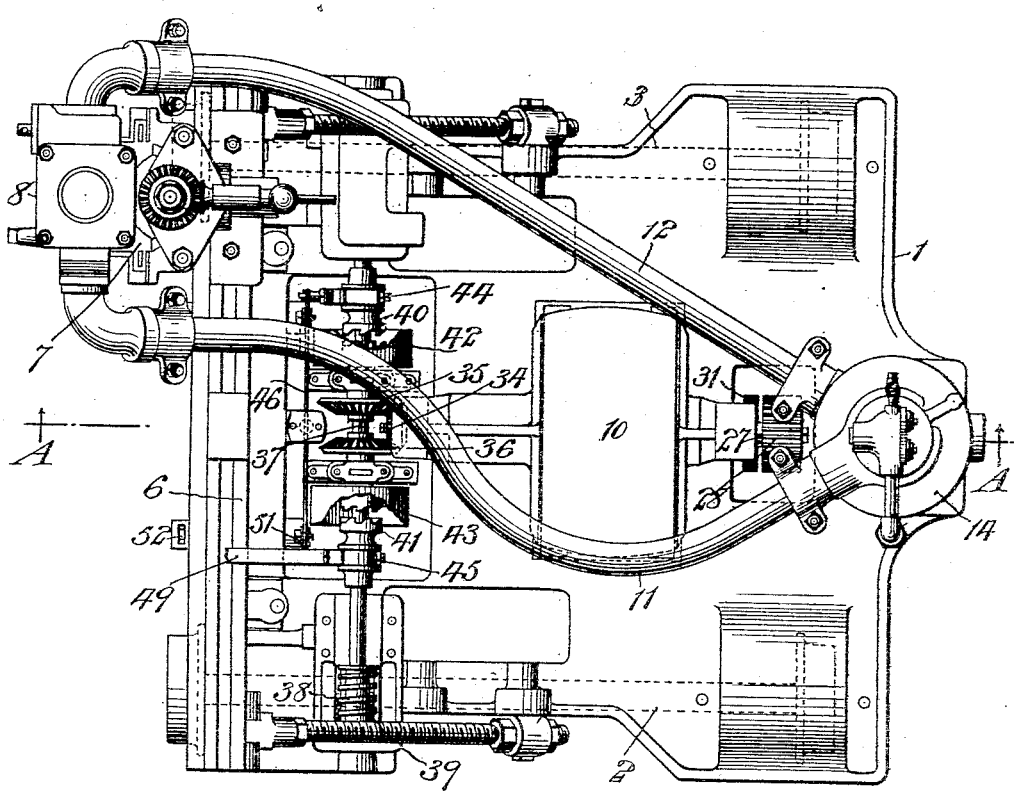
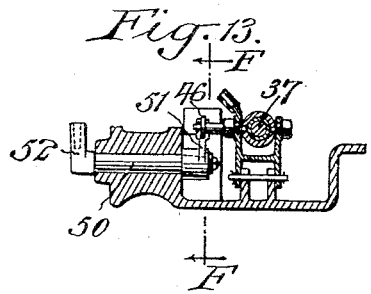
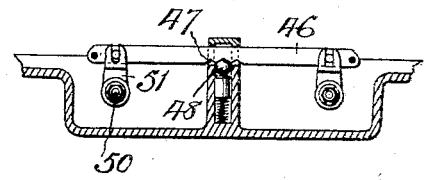

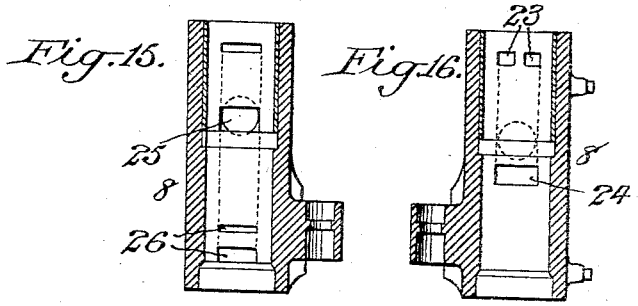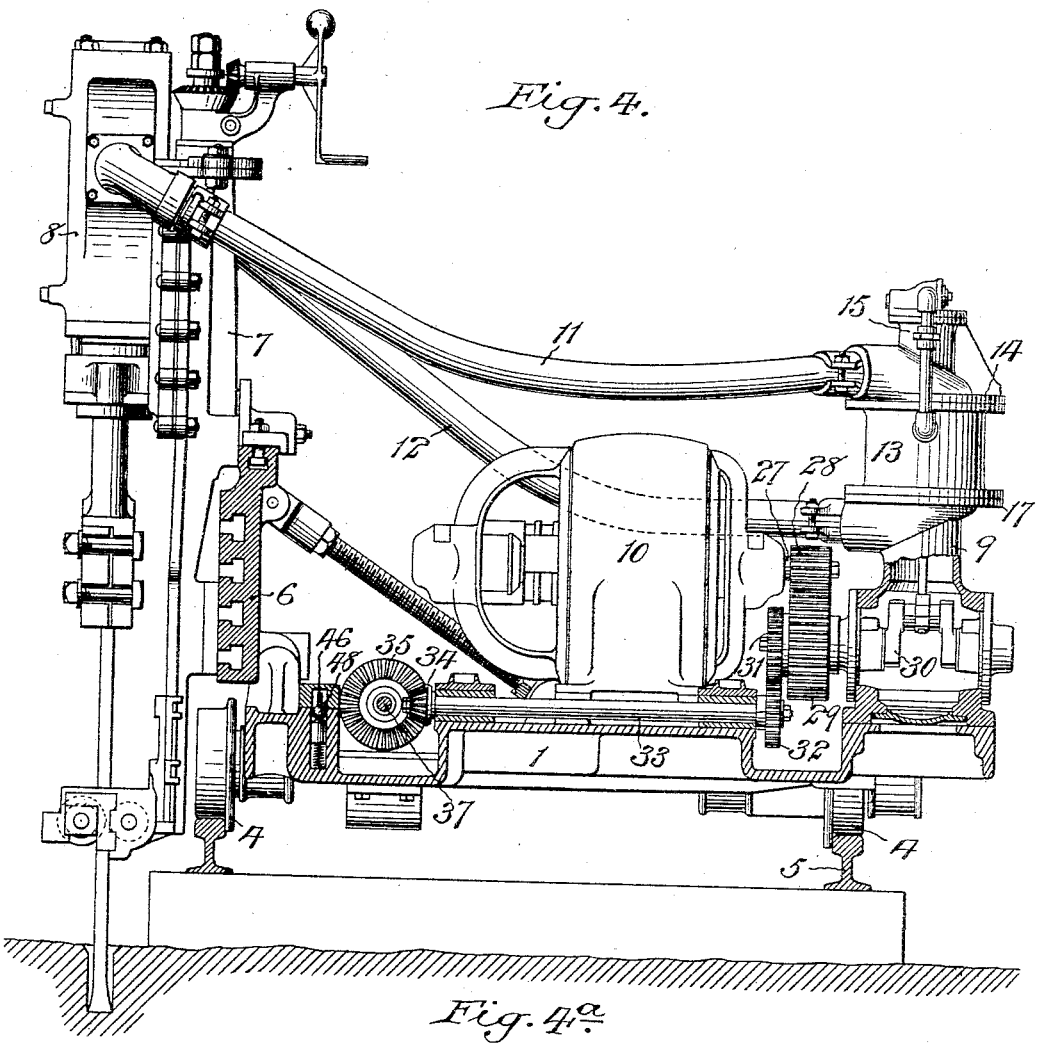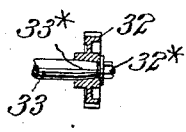

UNITED STATES PATENT OFFICE.

ARTHUR H. GIBSON, OF EASTON, PENNSYLVANIA, ASSIGNOR TO INGERSOLL-RAND COMPANY, OF NEW YORK, N. Y., A CORPORATION OF NEW JERSEY.

CHANNELING-MACHINE.

944,672.  Specification of Letters Patent.  Patented Dec. 28, 1909.

Application filed February 11, 1908. Serial No. 415,317.

*To all whom it may concern:*

Be it known that I, ARTHUR H. GIBSON, a subject of the King of Great Britain, and resident of Easton, in the county of Northampton and State of Pennsylvania, have invented a new and useful Improvement in Channeling-Machines, of which the following is a specification.

My invention consists in providing certain improvements in the construction, form and arrangement of the several parts of an electro-pneumatic channeling machine whereby the efficiency of the machine is increased and the cost of operating the same is decreased.

The principal object of this present invention is to provide certain improvements in the construction, form and arrangements of the several ports of the work cylinder and pulsator cylinder whereby the columns of air are more freely reciprocated through the said ports and tubes connecting them. The ports for both the work and pulsator cylinders are gradually decreased in area from their piston chambers to the tubes which connect the work and pulsator cylinders. This gradual reduction in the area of these ports prevents to a material degree the sudden changes in velocity and direction of the air and reduces materially the friction of the air and facilitates the reciprocation of the columns of air. Also a material reduction in the heat owing to friction, is accomplished, thus increasing the efficiency of the machine and insuring a more economical use of the air and the power required to reciprocate the columns of air. Also a material reduction in the leakage of the air past the pistons is accomplished, and it is possible to reduce the maximum pressure of the air to a lower point than has heretofore been possible where the passage of the air has been restricted by forming the ports and passages of normal areas.

Where the free passage of the air has been restricted as heretofore, the velocity of the air has to suddenly change from the velocity of the piston to that of the tube which is many times higher. The air is unable to change so suddenly from one velocity to another and hence there are strong eddies or currents established and a corresponding loss of power which is developed by the friction caused by these strong eddies or currents.
Furthermore, the heat caused by this friction is transmitted to other portions of the machine and may appear at many different points to the detrimental working of the machine. One point where the heat frequently appears is in the flexible tubes which are commonly made of rubber and the tubes are therefore caused to deteriorate because of this heating thereof.

This invention is herein shown in connection with a track channeler in which a truck is provided for carrying the percussive tool, the pulsator and its motor.

A practical embodiment of my invention is represented in the accompanying drawings in which—

Figure 1 is a front view of the machine, the work cylinder being shown in longitudinal central section to more clearly show the arrangement of the cylinder ports and passages, Fig. 2 is a back view of the machine, Fig. 3 is a top plan view, Fig. 4 is a view partially in section and partially in side elevation, taken in the plane of the line A—A of Fig. 3, looking in the direction of the arrows, Fig. 4ª is a detail section showing the manner of securing one of the gears to its shaft, Fig. 5 is an enlarged detail section showing one of the clutches and its adjacent parts, Fig. 6 is a detail section showing the feature of the gradual enlargement of the air passage as it leads from one of the tubes to the work cylinder, and Fig. 6ª is a similar view showing the same feature with respect to the other tube, Fig. 7 is a plan view of the outer cylinder head of the pulsator, Fig. 8 is a section taken in the plane of the line B—B of Fig. 9, looking in the direction of the arrows, Fig. 9 is a section taken in the plane of the line C—C of Fig. 7, looking in the direction of the arrows, Fig. 10 is a plan view of the inner cylinder head of the pulsator, and Fig. 11 is a section taken in the plane of the line D—D of Fig. 12, looking in the direction of the arrows, Fig. 12 is a section taken in the plane of the line E—E of Fig. 10, looking in the direction of the arrows, Fig. 13 is a detail section showing the means for throwing the truck driving mechanism into and out of operation, Fig. 14 is a detail section taken in the plane of the line F—F of Fig. 13, looking in the direction of the arrows, Fig. 15 is a detail longitudinal central section through the work cylinder, looking in one direction, and Fig. 16 is a similar view looking in the opposite direction.

The truck which carries the parts is denoted by 1 and it is provided with two axles 2 and 3, each axle having a pair of traction wheels 4 arranged to travel along the track 5. The truck 1 is provided with the usual swinging back frame 6, to which is pivotally adjusted the shell 7 of the work cylinder 8. The pulsator 9 is fixedly mounted on the truck 1, preferably at a point about midway the ends of the truck. An electric motor 10 is mounted on the truck in position to drive the pulsator and also the truck. The tool is driven by reciprocating columns of air through the flexible tubes 11 and 12, forming air passages connecting the opposite ends of the pulsator piston 13 with the opposite ends of the work cylinder 8. In the present instance the tube 11 is shown as connecting the outer end of the pulsator cylinder with the rear end of the work cylinder and the tube 12 is shown as connecting the inner end of the pulsator cylinder with the front end of the work cylinder.

The air passages of both tubes 11 and 12 are gradually increased in area as they enter both the pulsator cylinder and the work cylinder, for facilitating the passage of the air therethrough, as follows. The outer cylinder head 14, which also forms part of the pump cylinder 15, is provided with an annular port 16 surrounding the pump cylinder and opening into the outer end of the pulsator cylinder chamber, which annular port 16 gradually decreases in area as it leads to the end of the tube 11. Similarly, the inner cylinder head 17, which forms part of the pulsator piston crank casing, is provided with an annular port 18 opening directly into the inner end of the pulsator cylinder chamber, which port gradually decreases in area to the point where it connects with the end of the tube 12.

In the form shown herein the work cylinder 8 is provided with two piston chambers 19, 20, within which the heads 21, 22, of the work piston are fitted to reciprocate. The rear ports 23, 24, of the piston chambers 19, 20, lead together and are gradually reduced in area as they reach the point where the tube 11 is attached. The front ports 25, 26, of the piston chambers 19, 20, are joined together and gradually decrease in area to the point where the tube 12 is attached. It will thus be seen that a very free exit and entrance is provided for the air which passes through the tubes 11 and 12 and the points where the air is usually subjected to a great degree of friction are eliminated.

The shaft 27 of the electric motor is provided with a driving pinion 28 which meshes with a gear 29 on the crank shaft 30 of the pulsator. This crank shaft 30 is further provided with a gear 31 which meshes with a gear 32 on one end of a horizontal shaft 33 mounted in suitable bearings in the truck. The other end of this shaft 33 is provided with a bevel gear 34 which meshes with and is arranged to drive two bevel gears 35, 36, in opposite directions. These bevel gears are loosely mounted on a horizontal drive shaft 37 having worm and gear connections 38, 39, with the truck axles 2 and 3, the bevel gears 35, 36, forming part of two friction clutches, the sliding members 40, 41 of which are keyed to rotate with the shaft 37 and arranged to be interlocked with the friction members 42, 43, of the said bevel gears. Each of these friction members is arranged as shown in Fig. 5, which illustrates the clutch 40, 42, in which the member 42 normally rotates with its gear 35 by being frictionally clamped between a flange 35* of the gear 35 and a spring-pressed ring 42* secured to the interior of a cylindrical casing 42**. These movable clutch members have operating levers 44, 45, connected by a rod 46 so that they are moved simultaneously. This rod 46 is provided with three notches 47, one of which is arranged to be engaged by a spring-pressed locking ball 48 for yieldingly holding the one or the other of the clutches in its operative position or both of the clutches in their inoperative positions. One of these levers may be provided with a handle 49. When desired, these clutches may be operated from either of two different points in the front of the machine, as follows. Two short rock shafts 50 are mounted in the truck, each shaft being provided with an inner arm 51 engaged with the rod 46 and an outer socket arm 52 for the reception of the inner end of a removable hand lever.

The gear 32 is held on the tapered end 33* of the horizontal shaft 33 of the truck driving mechanism, by friction only, instead of by keying the gear to the shaft so that when any undue strain is imparted to the said gear, it will slip on the shaft and thus prevent the stripping of the teeth from any of the gears. This gear 32 is shown herein as clamped on the shaft 33 by a nut 32*.

By providing a free passage for the air between the flexible tubes and the work and pulsator cylinders, I am enabled to produce results superior to those heretofore produced both in the economy of operation and in effectiveness of operation. Take for instance, the gradual reduction in the area of the ports leading from the pulsator cylinder to the tubes; as the pulsator piston advances, the air just in front of the piston moves comparatively slowly. As the air passes through the port toward the tube, it will accelerate uniformly because of the gradual reduction in the area of the port so that when it reaches the tube, it will be traveling at a relatively high velocity. This arrangement of the ports reduces the air friction to a minimum and absolutely prevents the friction and consequent heating of the air owing to its contact with abrupt edges or abrupt turns in its course. It is evident that these ports may be constructed in many different forms the gist of the invention lying in the fact that the greatest possible amount of energy is transmitted to the tool from a predetermined amount of motive power.

The parts shown and described but not claimed herein, which relate to the mechanism whereby the truck driving means and the pulsator are both driven from a single pinion at one end of the motor shaft for permitting motors of various styles, shapes and sizes to be used without changing the other parts of the machine, form the subject matter of a divisional application filed by me on the 6th day of April 1908, its serial number being 425435.

What I claim is:

1. A pulsator cylinder having its outer head provided with an annular piston chamber port which gradually decreases in area as it leads from the said chamber.

2. A pulsator cylinder having its inner head provided with an annular piston chamber port which gradually decreases in area as it leads from the chamber.

3. A pulsator cylinder having both its outer and inner heads provided with annular piston chamber ports which gradually decrease in area as they lead from the chamber.

In testimony, that I claim the foregoing as my invention, I have signed my name in presence of two witnesses, this seventh day of February 1908.

ARTHUR H. GIBSON.

Witnesses:
   H. D. MAXWELL,
   C. D. PATTERSON.